United States Patent [19]
Charping et al.

[11] Patent Number: 5,316,428
[45] Date of Patent: May 31, 1994

[54] PALLET STORAGE RACK AND METHOD

[75] Inventors: Jimmy D. Charping, Taylors; Walter B. Watson, Greenville, both of S.C.

[73] Assignee: Engineered Products, Inc., Greenville, S.C.

[21] Appl. No.: 29,299

[22] Filed: Mar. 8, 1993

Related U.S. Application Data

[63] Continuation of Ser. No. 757,031, Sep. 9, 1991, abandoned.

[51] Int. Cl.$^5$ .............................................. B65G 1/02
[52] U.S. Cl. ...................................... 414/267; 414/786; 414/286; 211/134
[58] Field of Search ............... 414/266, 267, 277, 281, 414/286, 276, 786; 211/134, 153; 364/478

[56] References Cited

U.S. PATENT DOCUMENTS

| | | | |
|---|---|---|---|
| 3,323,655 | 6/1967 | Foran et al. | 211/134 |
| 3,759,403 | 9/1973 | Fernstrom | 414/286 X |
| 4,936,738 | 6/1990 | Brennan et al. | 414/267 X |

FOREIGN PATENT DOCUMENTS 198174  12/1982  Japan ...................................... 296/56

*Primary Examiner*—Frank E. Werner
*Attorney, Agent, or Firm*—Ralph Bailey

[57] ABSTRACT

A double wide, double deep pallet storage rack has a lowermost frame assembly provided with open front central aisles D opposite each double depth of pallets to facilitate storage and order picking as in distribution center warehouses providing an improved method of storage and order picking permitting individuals to enter the storage rack for article removal from a rear pallet of each double depth of pallets after a respective front pallet has been removed.

6 Claims, 2 Drawing Sheets

PALLET STORAGE RACK AND METHOD

This application is a continuation of application Ser. No. 07/757,031, filed Sep. 9, 1991, now abandoned.

BACKGROUND OF THE INVENTION

This invention relates to an improvement in double wide, double deep storage racks of the type utilized in distribution center warehouses and method to facilitate order picking.

Heretofore, it has been a general practice to utilize gravity flow storage systems wherein pallets are mounted on wheels, or rollers provided on the longitudinal runners to move full pallets forwardly for access to the rear pallets as the front pallets are removed. These systems are expensive to construct and difficult to maintain since a relatively complex structural system must be developed requiring considerable fabrication in the warehouse facility. The structure to accommodate the gravity feed pallets must be relatively sturdy, and the wheel or roller constructions are expensive and difficult to maintain.

The following U.S. Pat. Nos. are illustrative of gravity flow structural systems: 3,837,511; 4,197,047; 4,304,521; 4,341,313; 4,462,500; 4,527,937; 4,613,270; and 4,715,765.

Accordingly, it is an important object of this invention to provide a relatively simple inexpensive pallet storage structure to facilitate order picking which will be strong and safe to utilize.

Another important object of this invention is to provide a pallet storage rack permitting safe entry by an individual from the front in order to facilitate order picking from double wide, double deep pallet storage racks.

Still another important object of the invention is to provide a pallet storage rack which is double wide and double deep which may by safely entered by an individual from the front to facilitate order picking in the warehouse distribution centers.

Another important object of the invention is to provide a method of storage and order picking of articles wherein double wide, double deep racks are entered through a front aisle opposite a depth of storage pallets for article removal after a foremost pallet has been emptied and removed.

SUMMARY OF THE INVENTION

It has been found that a double wide, double deep storage rack may be provided wherein open central aisle portions are provided opposite each double depth of pallets at a front position of the storage rack to permit entry of the storage rack by individuals for order picking. Frame assemblies having such open central portions include spaced elongated longitudinal supports having transverse supports spaced from front to rear so as to provide smooth level upper surfaces for reception of a double width and double depth of storage pallets wherein order picking is facilitated. The method of storage and order picking contemplates utilizing central aisles opposite respective depths of pallets for entry of the storage racks from the front by operating personnel.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate a pallet storage rack having a plurality of stacked double wide shelf frame assemblies each supporting a double depth of pallets loaded with articles, wherein the pallets are carried on the shelf frame assemblies in front to rear relation for selective article removal. A plurality of elongated transversely spaced longitudinal supports A extend continuously from the front to the rear of said shelf frame assemblies. A plurality of transverse supports B are spaced longitudinally from a rear portion of said longitudinal supports forwardly. A base support means C elevate the longitudinal and transverse supports above a warehouse floor upon which the pallet storage rack is carried forming a lowermost of said plurality of stacked double wide shelf frame assemblies. An open central aisle D is opposite each double depth of pallets defined by the transverse supports at a front position of the lowermost of said double wide shelf frame assemblies. Thus, individuals may enter through the open central aisle D for article removal from a rear pallet of each double depth of pallets after a respective front pallet has been removed. As illustrated, the shelf frame assemblies which are stacked above respective lowermost shelf frame assemblies have continuous transverse supports at each front position. The transverse supports at each front position of the lowermost shelf frame assembly have a central member and a side member defining the open central portions of respective shelf frame assemblies.

Figure 1:
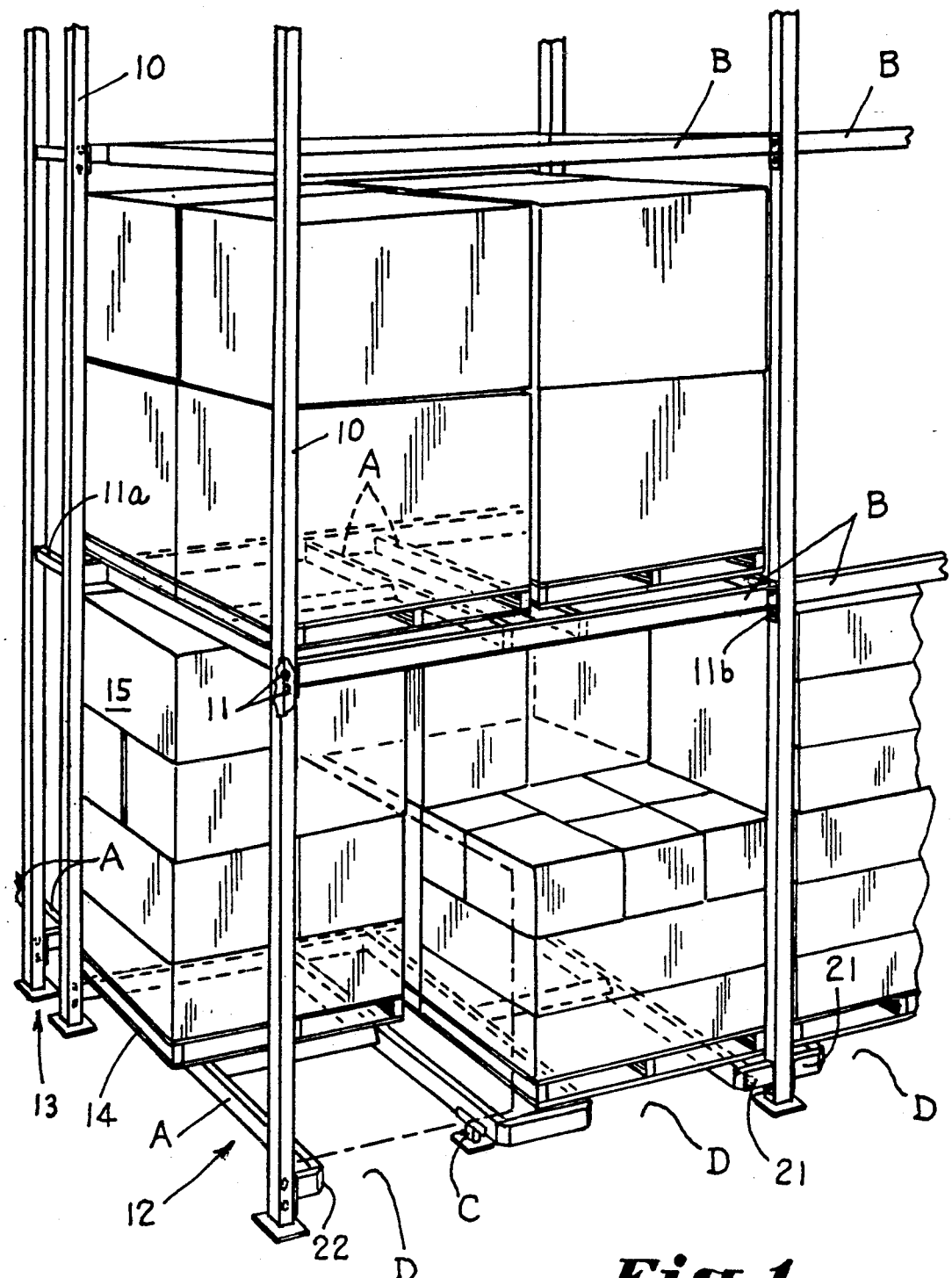
FIG. 1 is a perspective view looking toward a front left hand corner of a vertical pallet storage rack having a double wide, double depth of shelf frame assemblies constructed in accordance with the invention.

Referring more particularly to FIG. 1, it will be noted that a plurality of double wide, double deep shelf frame assemblies, comprising welded longitudinal and transverse supports A and B respectively, are stacked upon vertical support members 10 to which the shelf frame assemblies are bolted as at 11. Mounting brackets 11a are provided at each of the four corners of the integral shelf frame assemblies. The storage racks may be stacked to any practical height to which the forklift capabilities may accommodate and may be of several back to back sections as broadly designed at 12 and 13 so as to form sufficient longitudinal walkways at the front of each shelf frame assembly. The bays thus formed may be of any suitable length and provided with crosswalk passageways as desired. It is important to note that pallets 14 are provided for supporting stacked articles 15 in the customary manner. The back to back sections 12 and 13 are connected by suitable ties 11b.

A plurality of the elongated spaced longitudinal supports A extend continuously from the front to the rear of the shelf frame assemblies. The transverse supports B are continuous in the upper stacked shelf frame assemblies, as it is not needed to enter these areas for article picking, and the use of continuous supports facilitate structural strength and simplifies construction.

The shelf frame assemblies are provided with double rows of pallets and each row is double deep. In the lowermost shelf frame assembly, open central portions D are provided to facilitate entry by individual operators in order to facilitate order picking when the forwardmost of the pallets have been removed from each of the respective double widths of the pallet storage rack.

Figure 2:
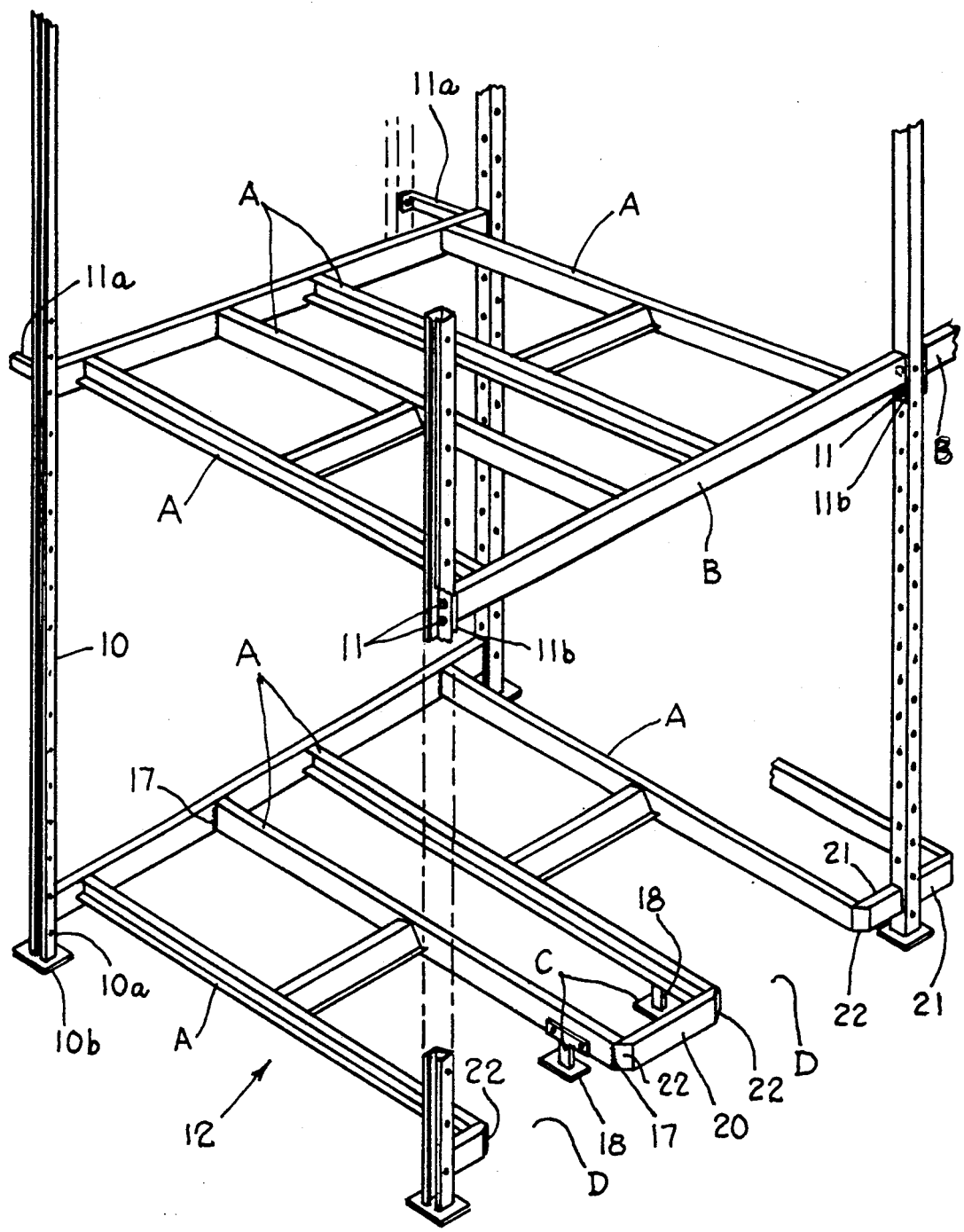
FIG. 2 is an enlarged perspective view further illustrating a lowermost order picking shelf frame assembly as illustrated in FIG. 1.

Referring now more particularly to FIG. 2, an enlarged illustration is provided of a lowermost of the double wide, double deep shelf frame assemblies. It will be noted that the structural members forming the shelf frame assemblies are welded at their adjoining portions as illustrated at 17 and are secured for stacking as by bolts 11 to the vertical frame members 10. The base support means C is provided by the lower portions 10a of the vertical support members 10, and base plate 10b are carried thereby. Additional base support members C include the stands 18 which include vertical legs 18a and base plates 18b for supporting a structural central portion on each of the shelf frame assemblies formed by adjacent spaced central longitudinal supports A which are bridged at the rear by a continuous transverse support B and in a forward portion by a central member 20 which defines at each end respective openings forming aisles D. The other side of respective aisles D is defined by a side frame member 21 which has a welded connection on one end with marginal longitudinal supports A on one end and with an adjacent vertical support member 10 on the other.

The fact that the shelf frame assemblies may be integrally fabricated by welding in the shop and assembled on location by bolts in stacked relation on the vertical support members 10 facilitates construction on location as well as adding structural integrity to the storage rack formed thereby.

It is thus seen that open central aisle portions D may be provided in the lowermost of the shelf frame assemblies to facilitate order picking. Individuals may enter without obstruction, and each entry portion is provided with beveled side frame entry portions 22 so as to avoid sharp edges in order to avoid injury to the operators. The lowermost shelf is supported in raised position to facilitate cleaning therebeneath. All use of mechanical wheels and rollers as in the prior art has been avoided, and a simplified stronger construction has been provided.

While a preferred embodiment of the invention has been described using specific terms,, such description is for illustrative purposes only, and it is to be understood that changes and variations may be made without departing from the spirit or scope of the following claims.

What is claimed is:

1. A pallet storage rack having a plurality of stacked double wide shelf frame assemblies each supporting a double depth of pallets loaded with articles, wherein said pallets are loaded on said shelf frame assemblies in front to rear relation for selective article removal, comprising:

at least four elongated longitudinal supports extending continuously from a front to a rear of said shelf frame assemblies, said longitudinal supports transversely spaced from each other to bear two loaded pallets disposed in side by side relation and extending transversely across each of said longitudinal supports, said longitudinal supports at ends of outermost ones of said longitudinal supports being connected to vertical frame members;

a plurality of transverse supports spaced longitudinally from a rear portion of said longitudinal supports;

a bottom double wide shelf frame assembly;

base support means carrying said bottom double wide shelf frame assembly above a warehouse floor upon which said pallet storage rack is carried; and an open central aisle within each double depth of pallets defined by said transverse supports opening at a front portion of said bottom double wide shelf frame assembly;

whereby individuals may enter through said open central aisle for article removal from a rear pallet of each double depth of pallets after a respective front pallet has been removed.

2. The structure set forth in claim 1 wherein each of said shelf frame assemblies stacked above respective lowermost shelf frame assemblies have continuous transverse supports at each front position.

3. The structure set forth in claim 2 wherein each of said transverse supports at each front position of said lowermost shelf frame assembly has a central member and a side member defining said open central aisle of respective shelf frame assemblies.

4. The structure set forth in claim 3 wherein each side member and central member is beveled at respective corners to form respective side entry portions.

5. The method of storing palletized articles on a pallet storage rack having a plurality of stacked double wide shelf frame assemblies each supporting a double depth of pallets loaded with articles, wherein said pallets are loaded on said shelf frame assemblies in front to rear relation for selective article removal, at least four elongated longitudinal supports extending continuously from a front to a rear of said shelf frame assemblies, said longitudinal supports transversely spaced from each other to bear two loaded pallets disposed in side by side relation and extending transversely across each of said longitudinal supports, said longitudinal supports at ends of outermost ones of said longitudinal supports being connected to vertical frame members, a plurality of transverse supports spaced longitudinally from a rear portion of said longitudinal supports, a bottom double wide shelf frame assembly, base support means carrying said bottom double wide shelf frame assembly above a warehouse floor, and order picking in a warehouse comprising the steps of:

placing said palletized articles on said storage rack in a double wide and double deep configuration of pallets from side to side and front to rear;

order picking said articles from front pallets;

removing respective front pallets when articles are removed therefrom so that thereafter access must be held to articles carried by rear pallets;

providing an aisle opening within each double depth of pallets at a front portion of said bottom double wide shelf frame assembly; and entering said aisle opening for gaining access to articles for order picking from pallets in a rear position of each double deep configuration of pallets.

6. The method set forth in claim 5 including the steps of positioning each aisle in a central portion of said front positions.

* * * * *